United States Patent
Froeschl

(10) Patent No.: US 10,279,760 B2
(45) Date of Patent: May 7, 2019

(54) SUPPLY RAIL FOR A MOTOR VEHICLE

(71) Applicant: Bayerische Motoren Werke Aktiengesellschaft, Munich (DE)

(72) Inventor: Joachim Froeschl, Herrsching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/661,714

(22) Filed: Jul. 27, 2017

(65) Prior Publication Data

US 2017/0320454 A1 Nov. 9, 2017

Related U.S. Application Data

(63) Continuation of application No. PCT/EP2016/051555, filed on Jan. 26, 2016.

(30) Foreign Application Priority Data

Jan. 28, 2015 (DE) .................. 10 2015 201 440

(51) Int. Cl.
*H05K 7/20* (2006.01)
*B60R 16/03* (2006.01)
(Continued)

(52) U.S. Cl.
CPC .......... *B60R 16/03* (2013.01); *B60L 11/1874* (2013.01); *B60L 11/1879* (2013.01);
(Continued)

(58) Field of Classification Search
None
See application file for complete search history.

(56) References Cited

U.S. PATENT DOCUMENTS

| 4,316,234 A | 2/1982 | Takagi et al. |
| 5,327,987 A | 7/1994 | Abdelmalek |

(Continued)

FOREIGN PATENT DOCUMENTS

| DE | 101 53 587 A1 | 5/2002 |
| DE | 10 2009 000 204 A1 | 7/2010 |

(Continued)

OTHER PUBLICATIONS

International Search Report (PCT/ISA/210) issued in PCT Application No. PCT/EP2016/051555 dated Apr. 11, 2016 with English-language translation (six (6) pages).
(Continued)

*Primary Examiner* — Courtney L Smith
(74) *Attorney, Agent, or Firm* — Crowell & Moring LLP

(57) ABSTRACT

A supply rail for a vehicle includes a first busbar which is designed to provide electrical energy with a first supply voltage for supplying energy to a large number of electrical modules of the vehicle. In this case, the electrical modules of the large number of electrical modules are arranged at different points of the vehicle. The supply rail includes means for data transmission designed to allow data interchange between at least two of the large number of electrical modules. The supply rail has a large number of slots for the large number of electrical modules, wherein a first slot of the large number of slots is designed to connect a first electrical module of the large number of electrical modules to the first busbar and to the means for data transmission by way of a first plug connection. The supply rail includes a temperature-control duct which is designed to conduct a thermally conductive medium past the large number of electrical modules.

19 Claims, 2 Drawing Sheets

(51) Int. Cl.
*B60L 11/18* (2006.01)
*H02G 3/03* (2006.01)
*H02G 3/04* (2006.01)
*H02G 3/22* (2006.01)

(52) U.S. Cl.
CPC ............. *H02G 3/03* (2013.01); *H02G 3/0406* (2013.01); *H02G 3/22* (2013.01); *B60L 2240/545* (2013.01); *Y02T 10/7005* (2013.01); *Y02T 10/705* (2013.01)

(56) References Cited

U.S. PATENT DOCUMENTS

| | | | |
|---|---|---|---|
| 6,450,275 | B1 | 9/2002 | Gabriel et al. |
| 7,876,561 | B2* | 1/2011 | Schnetzka ............. F25B 49/025 180/297 |
| 8,159,823 | B2* | 4/2012 | Murakami ............ H01L 23/473 180/243 |
| 9,943,007 | B2* | 4/2018 | Enami ................. H05K 7/20145 |
| 2004/0223301 | A1* | 11/2004 | Muller .................. H02M 7/003 361/699 |
| 2005/0011692 | A1* | 1/2005 | Takahashi ................ B60R 16/04 180/68.5 |
| 2008/0079021 | A1* | 4/2008 | Bayerer ................. H01L 23/373 257/177 |
| 2008/0203077 | A1 | 8/2008 | Brun et al. |
| 2009/0183935 | A1* | 7/2009 | Tsuchiya .................. B60K 1/04 180/68.1 |
| 2011/0075327 | A1 | 3/2011 | Schmid |
| 2011/0162901 | A1 | 7/2011 | Lucas et al. |
| 2012/0090905 | A1* | 4/2012 | Vollmer ............. B60H 1/00392 180/65.1 |
| 2017/0303430 | A1* | 10/2017 | Enami ................ H05K 7/20145 |

FOREIGN PATENT DOCUMENTS

| | | |
|---|---|---|
| DE | 10 2012 203 351 A1 | 9/2013 |
| DE | 10 2013 218 668 A1 | 3/2015 |
| EP | 1 747 920 A1 | 1/2007 |
| GB | 2471382 A | 12/2010 |
| WO | WO 97/42058 A1 | 11/1997 |
| WO | WO 2009/141728 A2 | 11/2009 |
| WO | WO 2010/136863 A1 | 12/2010 |
| WO | WO 2014/076476 A1 | 5/2014 |

OTHER PUBLICATIONS

German-language Written Opinion (PCT/ISA/237) issued in PCT Application No. PCT/EP2016/051555 dated Apr. 11, 2016 (six (6) pages).
German Search Report issued in counterpart German Application No. 10 2015 201 440.1 dated Dec. 7, 2015 with partial English-language translation (thirteen (13) pages).

* cited by examiner

SUPPLY RAIL FOR A MOTOR VEHICLE

CROSS REFERENCE TO RELATED APPLICATIONS

This application is a continuation of PCT International Application No. PCT/EP2016/051555, filed Jan. 26, 2016, which claims priority under 35 U.S.C. § 119 from German Patent Application No. 10 2015 201 440.1, filed Jan. 28, 2015, the entire disclosures of which are herein expressly incorporated by reference.

BACKGROUND AND SUMMARY OF THE INVENTION

The invention relates to a device for distributing electrical energy to a plurality of control units of a vehicle.

A vehicle (in particular a road vehicle such as e.g. a passenger car, a truck or a motorbike) includes a multiplicity of control units for a multiplicity of functions of the vehicle. The individual control units have to be supplied with electrical energy from an on-board power system of the vehicle. Furthermore, the individual control units have to be connected into a communications network in order to permit data to be exchanged between various control units of the vehicle. Furthermore, suitable cooling of the control units is usually necessary. To summarize, the electrical supply, the connection into a communications network and/or the cooling of the multiplicity of control units gives rise to substantial integration expenditures, high costs and a need for a large amount of installation space.

The present document is concerned with the technical task of permitting efficient integration of a multiplicity of control units in a vehicle.

The object is achieved by a supply rail for a motor vehicle, as well as an on-board power supply system having the supply rail, in accordance with embodiments of the invention.

According to one aspect, an on-board power system for a vehicle is described. The on-board power system includes a multiplicity of electrical modules. Exemplary modules are a control unit of the vehicle, a DC converter, a charger device, a switching element, a fuse, an electrical energy accumulator, etc. The electrical modules of the multiplicity of electrical modules are usually arranged at least partially at different points on the vehicle here. In other words, the on-board power system is designed to connect electrical modules which are located at different points (e.g. in different regions) on the vehicle into the on-board power system. For example, at least one electrical module can be arranged in a front region (e.g. under a hood) of the vehicle. Furthermore, at least one other electrical module can be arranged in a rear region (e.g. in or under a trunk) of the vehicle.

The on-board power system also includes a supply rail. The supply rail is designed to provide an energy supply for the large number of modules. Furthermore, the supply rail is designed to permit data communication between the modules. In particular, the supply rail includes a first busbar which is designed to provide electrical energy with a first supply voltage (in particular a DC voltage, e.g. at 12 V or 48 V) for supplying energy to the multiplicity of electrical modules. The first busbar can have a supply conductor and a separate ground conductor. The first supply voltage can be applied between the supply conductor and the ground conductor.

Furthermore, the supply rail includes means for transmitting data, which means are configured to permit a data exchange between (in each case) at least two of the multiplicity of electrical modules. The means for transmitting data can include, in particular, one or more dedicated data lines which run at least partially parallel to the first busbar along the supply rail. Alternatively or additionally, the means for transmitting data can include electrical conductors (in particular the supply conductor and the ground conductor) of the first busbar for a power line communication. The provision of power line communication constitutes an efficient possible way of providing (if appropriate additional) transmission bandwidth for the data exchange between the multiplicity of electrical modules.

Furthermore, the supply rail includes a multiplicity of plug-in locations for the multiplicity of electrical modules. In this context a first plug-in location of the multiplicity of plug-in locations is designed to connect, via a first plug-in connection, a first electrical module of the multiplicity of electrical modules to the first busbar and to the means for transmitting data. In a corresponding way, via the multiplicity of plug-in locations the other modules of the multiplicity of modules can be connected via plug-in connections to the first busbar and to the means for transmitting data.

The on-board power system permits, through the use of a central supply rail, a multiplicity of electrical modules of the vehicle, which are arranged at different points on the vehicle, to be connected efficiently in terms of cost and installation space. For example, the central supply rail can extend from the front region of the vehicle as far as the rear region of the vehicle (e.g. as a rail which runs in a linear fashion). Electrical modules of the vehicle can then be plugged in at different points in the plug-in locations of the supply rail in order to integrate the modules into the on-board power system.

The first electrical module can comprise a circuit board with a plug. The plug of the first electrical module can then form, with the first plug-in location, the first plug-in connection. That is to say the electrical modules can have plugs which can each be plugged into a plug-in location in order to connect the electrical module to the first busbar and to the means for transmitting data. The plugs can be permanently connected to a circuit board on the respective module (corresponding to plug-in cards of a computer). In particular the modules can be implemented as plug-in cards which can each be plugged into a plug-in location of the supply rail in order to connect the respective module to the first busbar and to means for transmitting data. The supply rail can correspondingly be constructed similarly to a motherboard of a computer and can provide the multiplicity of plug-in locations for the electrical modules. This permits an efficient connection of the multiplicity of modules into the on-board power system.

The first electrical module can even have no module-specific housing. In other words, an electrical module can be plugged into a plug-in location of the supply rail without having a separate housing (e.g. as a plug-in card). The supply rail can then be designed to provide a mechanical protection for the multiplicity of electrical modules (e.g. for the multiplicity of plug-in cards). For example, a mechanical protection can be provided by a circuit board of the supply rail on the plug-in location side of the supply rail. The circuit board of the supply rail can comprise the first busbar and the means for transmitting data. Furthermore, a common housing (e.g. a common cover) can be provided for all electrical modules, which are plugged onto the supply rail. Therefore, the installation space for the multiplicity of modules can be reduced.

The first electrical module can be an energy management control unit for the on-board power system. The energy management control unit can be designed to ensure that a requirement for electrical energy in the vehicle is covered. For this purpose, the energy management control unit can be designed to control, via the means for transmitting data, at least one other module of the multiplicity of electrical modules and/or to receive data from at least one other module of the multiplicity of electrical modules. In this context, the at least one other module can comprise one or more of: a control unit for an electrical energy accumulator (e.g. for a battery) of the on-board power system; a control unit for a generator of electrical energy (e.g. for a dynamo or a generator) of the on-board power system; a control unit for an electrical consumer of the on-board power system; a power switch; and/or a fuse.

By placing the energy management control unit in a plug-in location of the supply rail, the energy management control unit is enabled to efficiently communicate with a multiplicity of other electrical modules of the vehicle in order to detect the requirement for electrical energy and, if appropriate, adapt it, and in order to make an energy generator of the vehicle generate sufficient electrical energy.

The energy management control unit can be designed to measure a current through the first busbar at the first plug-in location. Alternatively or additionally, the energy management control unit can be designed to measure a level of the first supply voltage at the first plug-in location. The placing of the energy management control unit in a plug-in location of the supply rail therefore permits efficient monitoring of an electrical on-board power system provided via the first busbar.

Alternatively or additionally, the first electrical module (or another module of the multiplicity of modules) can be a central gateway for a data communication means network of the vehicle. The central gateway can be connected to a multiplicity of different bus systems (e.g. a CAN bus, a FlexRay bus, an Ethernet bus, a MOST bus, a LIN bus, etc.) via the means for transmitting data. Furthermore, the central gateway can be designed to permit a data exchange between the different bus systems. Furthermore the central gateway can be designed to control, via the means for transmitting data, a data flow from or to at least one module of the multiplicity of electrical modules. Efficient control of the data flows in the vehicle is made possible by the placing of the gateway in a plug-in location of the supply rail.

The supply rail can also comprise a second busbar which is designed to provide electrical energy in the case of a second supply voltage for the energy supply of the multiplicity of electrical modules of the vehicle. In this context, the second supply voltage differs from the first supply voltage. The first supply voltage can be e.g. 12 V, and the second supply voltage can be e.g. 48 V (or vice versa). The second busbar typically runs at least partially parallel to the first busbar along the supply rail (in particular along the multiplicity of plug-in locations). By way of the integration of a second busbar into the supply rail of the vehicle, electrical multi-voltage on-board power systems can be efficiently implemented in a vehicle. Furthermore, depending on the local requirement by use of a distributed arrangement of DC/DC converters in the plug-in locations along the supply rail it is possible to switch electrical energy between the first and second busbars.

According to a further aspect, a supply rail for a vehicle is described. The supply rail can have one or more of the features described in this document. The supply rail can be used in an on-board power system of a vehicle (e.g. in the abovementioned on-board power system).

As already explained, the supply rail typically comprises at least a first busbar which is designed to provide electrical energy with a first supply voltage for supplying the energy to a multiplicity of electrical modules of the vehicle. In this context, the electrical modules of the multiplicity of electrical modules are typically arranged at different points or in different regions of the vehicle.

Furthermore, the supply rail typically comprises means for transmitting data, which means are configured to permit a data exchange between (in each case) at least two of the multiplicity of electrical modules. As already explained above, the means for transmitting data can comprise one or more dedicated data lines. Alternatively or additionally, power line communication can be made possible via the lines of the first busbar (and/or a second busbar).

Furthermore, the supply rail comprises a multiplicity of plug-in locations for the multiplicity of electrical modules, wherein a first plug-in location of the multiplicity of plug-in modules is designed to connect, via a first plug-in connection, a first electrical module of the multiplicity of electrical modules to the first busbar and to the means for transmitting data. The multiplicity of plug-in locations can, as already explained, be arranged on a circuit board of the supply rail. The electrical modules can be plugged (at least partially) as plug-in cards into a respective plug-in location.

The supply rail can also comprise a temperature-control duct which is designed to carry a thermally conductive medium past the multiplicity of electrical modules or past the multiplicity of plug-in locations. In particular, the temperature-control duct can be arranged along the multiplicity of plug-in locations. In this context, the thermally conductive medium can comprise a liquid or a gaseous medium. For example, the temperature-control duct comprises at one first end of the supply rail an inlet for the thermally conductive medium, and at a second end of the supply rail an outlet for the thermally conductive medium. The medium can then be carried past a multiplicity of plug-in locations between the first and second ends in order to carry away thermal energy (in particular heat) from the plug-in locations (and from the modules placed therein) or in order to output thermal energy to the plug-in locations (and the modules placed therein).

The provision of a supply rail with a temperature-control duct permits temperature control of the multiplicity of electrical modules of a vehicle which is efficient in terms of cost and installation space. Furthermore, the energy consumption of the vehicle for the temperature control can be reduced by centralizing the temperature control.

The temperature-control duct can be formed at least partially by the bodywork of the vehicle. For example, a side wall of the temperature-control duct can be formed by the bodywork of the vehicle. It is therefore possible to provide a temperature-control duct which is efficient in terms of cost and installation space.

The supply rail can comprise means (e.g. specific materials and/or heat sinks) which permit thermal energy to be transmitted with a specific conductivity from the first electrical module to the thermally conductive medium, and vice versa. The specific conductivity is preferably higher here than a conductivity of air. It is therefore possible to achieve the most comprehensive possible exchange of thermal energy between the electrical modules and the thermally conductive medium.

According to a further aspect, an on-board power system for a vehicle is described. As already explained, the on-board power system comprises a multiplicity of electrical modules, wherein the electrical modules of the multiplicity of electrical modules are arranged at least partially at different points on the vehicle. Furthermore, the on-board power system comprises a supply rail which is described in this document. This supply rail can be a temperature-control duct, as explained above.

The on-board power system can comprise a control unit which is designed to detect a requirement for thermal energy of the multiplicity of electrical modules. In particular it is possible to detect whether thermal energy is to be fed to the modules or whether thermal energy is to be extracted from the modules. Furthermore, the quantity of thermal energy which is to be absorbed or carried away can be determined. For example, for this purpose it is possible to detect current temperatures of the electrical modules from which it typically becomes apparent whether a module has to be cooled or heated.

The control unit can also be designed to determine a property of the thermally conductive medium, in particular a temperature and/or a pressure of the thermally conductive medium, as a function of the detected requirement of thermal energy. For example it is possible to detect which temperature and/or which pressure the thermally conductive medium should have at the inlet of the temperature-control duct for the detected quantity of thermal energy to be able to be carried away from the electrical modules or output to the electrical modules. The use of a central temperature-control duct therefore permits comprehensive and efficient thermal management for a multiplicity of electrical modules of the vehicle.

The control unit can also be designed to detect when the vehicle is in a regeneration phase. In a regeneration phase, the vehicle can typically convert kinetic energy of the vehicle into another form of energy (in particular into electrical energy). The converted energy can then be used in the vehicle (in particular in an electrical on-board power system of the vehicle). It is therefore possible for energy consumption of the vehicle to be reduced. The time of a regeneration phase can, under certain circumstances, be predicted, for example on the basis of navigation data of the vehicle. Furthermore, it is possible to detect whether the vehicle is already in a regeneration phase or whether a regeneration phase is starting.

The control unit can be designed to cause the thermally conductive medium to be adapted according to the determined property during the regeneration phase. In particular, a temperature and/or a pressure of the medium can be changed during the regeneration phase. For example, a temperature of the medium can be reduced and/or a pressure of the medium can be increased (in order to subsequently be able to absorb heat from the electrical modules). It is therefore possible for the medium and the temperature-control duct to be used as a thermal accumulator for regenerated energy. This gives rise to a further reduction in the energy consumption of the vehicle.

The control unit can be arranged in a plug-in location of the supply rail. Furthermore, the control unit can be designed to communicate with the multiplicity of electrical modules via the means for transmitting data, in order to detect the requirement for thermal energy. In particular, temperature information of the individual modules can be transferred to the control unit via the means for transmitting data.

The control unit can also be designed to determine that thermal energy is to be fed to a component of the vehicle (e.g. a lead battery of the vehicle or an air-conditioning unit of the vehicle) which is not arranged on one of the multiplicity of plug-in locations of the supply rail. For example it is possible to detect that the temperature of a lead battery undershoots a specific threshold value and therefore heating should be carried out. The control unit can then cause the thermally conductive medium to be at least partially fed to the component of the vehicle at an outlet of the temperature-control duct in order to feed thermal energy to the component. It is therefore possible to improve the method of functioning of the component in a cost-efficient way.

According to a further aspect, a vehicle (e.g. a passenger car, a truck or a motorbike) is described which comprises the on-board power system described in this document.

It is to be noted that the methods, devices and systems described in this document can be used both alone as well as in combination with other methods, devices and systems which are described in this document. Furthermore, any aspects of the methods, device and systems which are described in this document can be combined with one another in a variety of ways.

Other objects, advantages and novel features of the present invention will become apparent from the following detailed description of one or more preferred embodiments when considered in conjunction with the accompanying drawings.

DETAILED DESCRIPTION OF THE DRAWINGS

As explained at the outset, the present document is concerned with the technical objective of supplying electronic modules of a vehicle (in particular control units) with electrical energy in a way which is efficient in terms of cost and installation space and connecting said electronic modules to a communications network (e.g. to a data bus of the vehicle).

Figure 1:
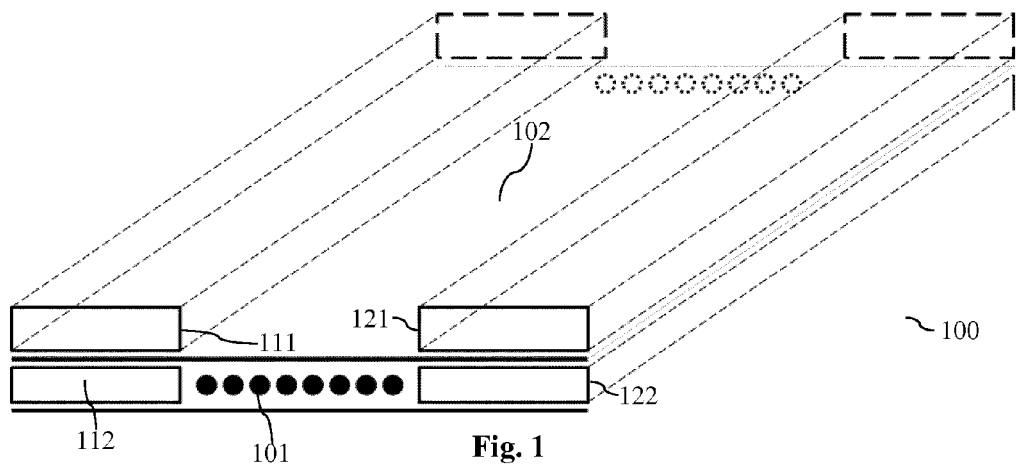
FIG. 1 is a schematic diagram of an exemplary supply rail for a vehicle.

In this context, FIG. 1 shows an exemplary supply rail 100. The illustrated supply rail 100 includes a first busbar 111, 112 for providing electrical energy with a first supply voltage (e.g. 12 V). The first busbar 111, 112 has a first supply conductor 111 and a first ground conductor 112. Furthermore, the supply rail 100 can include a second busbar 121, 122 for providing electrical energy with a second supply voltage (e.g. 48 V). The second busbar 121, 122 has a second supply conductor 121 and a second ground conductor 122. If appropriate, the first and second busbars can share a common ground conductor 112, 122.

In the illustrated example, the supply rail 100 has a linear shape. The supply rail 100 can be designed to cross at least partially through a vehicle in the longitudinal direction. It is therefore possible to supply electrical modules with electrical energy at different points in the vehicle.

The supply rail 100 can also include one or more data lines 101. The data lines 101 can run parallel to the one or more busbars 111, 112, 121, 122, in order to connect the electrical modules (e.g. the control units) of a vehicle to a data network of the vehicle.

Furthermore, the supply rail 100 includes a multiplicity of plug-in locations 102 which are arranged along the one or more busbars 111, 112, 121, 122. An electrical module can have a plug which can be plugged into a plug-in location 102 of the multiplicity of plug-in locations 102 of the supply rail 100. An electrical connection of the electrical module to one or more of the busbars 111, 112, 121, 122 can be established via the plug-in connection which has been produced in this way. Furthermore, a data connection between the electrical module and the one or more data lines 101 can be established via the plug-in connection. The multiplicity of plug-in locations 102 therefore permit the efficient connection of electrical modules to an electrical on-board power system of the vehicle (via the one or more busbars 111, 112, 121, 122) or a data network of the vehicle (via the one or more data lines 101).

Figure 2A:
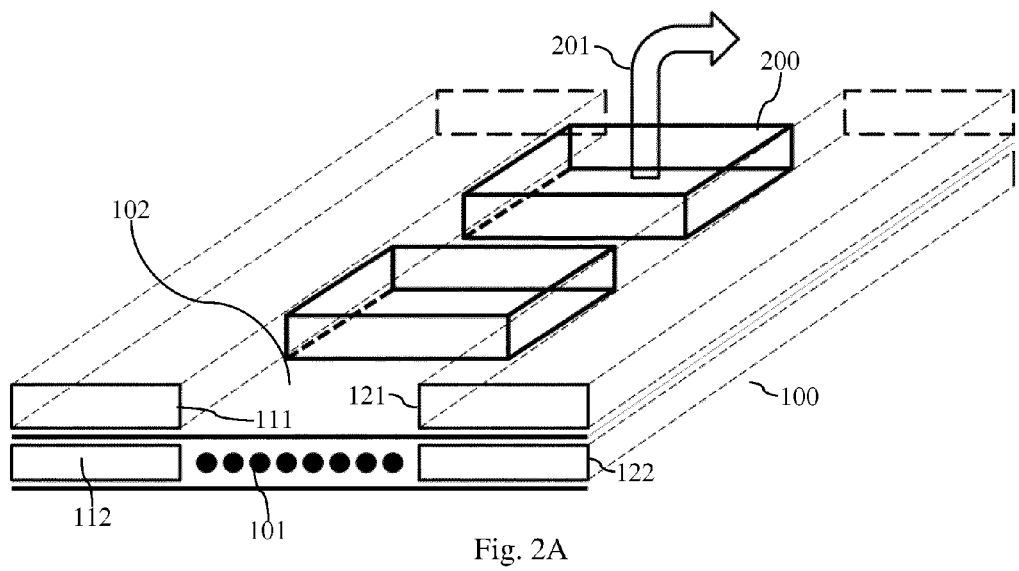
FIG. 2A is a schematic diagram of an exemplary supply rail having a multiplicity of electrical modules.

FIG. 2A shows the supply rail 100 with two exemplary electrical modules 200. The electrical modules 200 are each arranged on a plug-in location 102 of the supply rail 100 and are therefore supplied with electrical energy and connected to a data network of the vehicle. An electrical module 200 can be connected to further components of the vehicle via one or more lines 201, e.g. via a stub line. For example, a module 200 can be connected to a sensor or an actuator of the vehicle via a line 201.

Figure 2B:
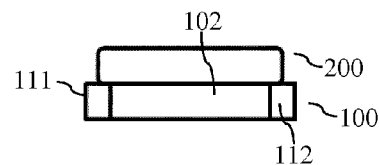
FIG. 2B is a schematic diagram of an exemplary supply rail in a side view.

FIG. 2B shows a side view of a supply rail 100, wherein in the example illustrated in FIG. 2B the voltage conductor 111 and the ground conductor 112 of a busbar are each arranged on one side of the plug-in locations 102. Furthermore, FIG. 2B shows a module which is placed on the supply rail 100.

An electrical module 200 can be e.g. a control unit of the vehicle. In particular, an electrical module 200 can be a control unit for energy management and power management and/or a gateway/router for the management of the data network of the vehicle. In other words, a control unit for energy management of the vehicle can be arranged as a plug-in module 200 in the supply rail 100 and therefore carry out the control of the distribution of electrical energy in the vehicle via the supply rail 100. Alternatively or additionally, a central data gateway of the vehicle can be arranged as a plug-in module 200 in the supply rail 100 and therefore carry out the control of the data traffic in the vehicle via the supply rail 100.

The data connection of the plug-in modules 200 is made via the one or more data lines 101 of the supply rail 100 and the energy supply of the plug-in modules 200 is provided via at least one of the busbars 111, 112, 121, 122. The power supply can be provided here redundantly from two voltages (by means of two separate busbars 111, 112, 121, 122), which is advantageous or, under certain circumstances, can also be necessary, in particular, for safety classification of the energy and power management system in a vehicle. Furthermore, the heat of a plug-in module 200 can be carried away via the supply rail 100 as a heat sink.

Alternatively or additionally to the use of a data line 101, power line communication, i.e. a communication connection which is made by way of modulated signals on a busbar 111, 112 can be used. When power line communication is used, under certain circumstances no data lines are necessary. Furthermore, a combination of data lines 101 and power line communication is also possible, e.g. in order to increase the bandwidth of a data connection.

The power and voltage measurement in the on-board power system can be carried out directly at the connection of the energy management control unit 200 to one of the busbars 111, 112.

The sensors of the vehicle for electrical energy accumulators (e.g. a battery), energy generator (e.g. a generator) and/or for electrical consumers can be connected via the data lines 101, with the result that information about the sensors can be efficiently passed onto the energy management control unit 200. In particular, in this way no further cable connections or plug-in connections 201 are required.

In an analogous fashion, the actuators of the vehicle (e.g. electrical switches and/or fuses) can also be connected without additional cabling expenditure to the supply line 100, e.g. can be connected and/or screwed directly into the supply rail 100 and connected to the energy management control unit 200.

The data lines 101 can be in direct contact with the data management (e.g. with the gateway) of the vehicle. The data management system distributes and filters the data flows between the various data bus systems of the vehicle and carries out the network management of the data network of the vehicle.

Further exemplary modules 200 which can be placed on a plug-in location 102 of the supply module 100 include e.g. a DC/DC converter which is designed to exchange electrical energy between the first busbar 111, 112 and the second busbar 121, 122. This permits electrical energy to be converted as close as possible to the respective electrical consumers (and therefore in an energy-efficient fashion) and to be provided where necessary.

The electrical modules 200 (in particular the control unit for energy management and/or the gateway for the data management) can be plugged without a separate housing into the supply rail 100. It is therefore possible to reduce costs for the individual modules 200. A mechanical protection can even be provided, on the one hand, by way of the supply rail 100 (in particular on the plug-in location 102 side and, under certain circumstances, laterally by the one or more busbars 111, 121). Furthermore, a cover can be provided for the plug-in locations 102 in order to provide a mechanical protection for the modules 200 on the upper side of the modules 200.

Such integration of electrical (e.g. of electronic) modules 200 in a vehicle allows costs to be saved (in particular through a saving of installation space). Furthermore, by plugging in modules 200 it is possible to dispense with housings for the individual modules 200. The connection of the modules 200 (in particular the connection of a central energy management control unit and/or of a data gateway) via the supply rail 100 gives rise to a substantial reduction in cabling expenditure and plug-in connections. Furthermore, the expenditure on maintenance for vehicles is reduced owing to the possibility of a simplified exchange of plug-in modules 200. Furthermore, by use of a supply rail 100 a plurality of power supplies 111, 121 (if appropriate at different voltage levels) can be provided efficiently. It is therefore possible to permit increased safety classification with respect to power supplies for automated/autonomous driving.

As already explained above, the supply rail 100 can be used for conducting away heat from the individual electrical modules 200. In the case of a distributed arrangement of electrical modules in the vehicle, optimum temperature control of the individual modules over the entire vehicle is typically not possible. Each module is typically temperature-controlled in an insulated fashion and heat which is generated by the individual modules is carried away locally from the module.

Figure 3A:
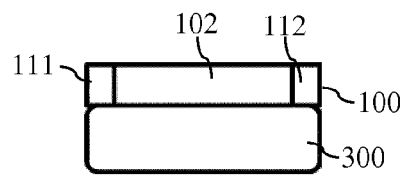
FIGS. 3A and 3B are schematic diagrams of exemplary supply rails with a temperature-control duct in a side view.
Figure 3B:
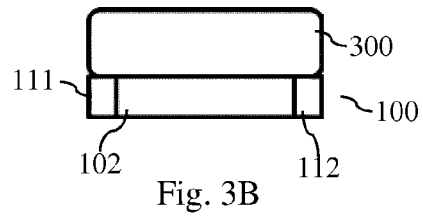

The placing of the electrical modules 200 on a central supply rail 100 of the vehicle makes it possible to control the temperature of the electrical modules 200 in a coordinated fashion and therefore reduce the costs and the installation space for the temperature control of the electrical modules 200 in the vehicle. FIG. 3A shows an exemplary supply rail 100 with a temperature-control duct 300 which is arranged underneath the supply rail 100 (e.g. underneath the plug-in locations 102). FIG. 3B shows an example in which the temperature-control duct 300 is arranged above the supply rail 100. The temperature-control duct 300 can carry a gaseous or liquid thermally conductive medium (e.g. air or water). The medium is carried along the supply rail 100 through the temperature-control duct 300 and can therefore absorb heat from the modules 200 which have been plugged onto the supply rail 100, and can output heat to the modules 200.

An infrastructure assembly is therefore described which brings about the cooling or heating of modules 200 at a supply rail 100. Exemplary modules 200 are DC converters (i.e. DC/DC converters), charger devices (e.g. with AC/DC converters), control units with microprocessors, electromechanical and/or electronic switching elements, fuses, electrical energy accumulators, etc. A liquid duct or air duct 300 can be integrated into the supply rail 100 or attached to the supply rail 100. The heat-conducting junction with the respective thermally conductive medium is effected e.g. via thermally conductive materials and/or heat sinks at the modules 200 and/or at the supply rail 100.

Figure 3C:
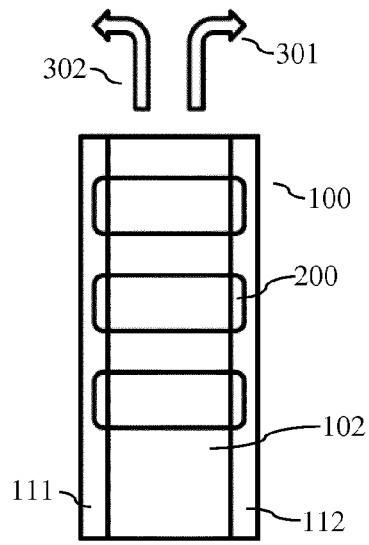
FIG. 3C is a schematic diagram of an exemplary supply rail with a temperature-control duct in a plan view.

In the case of liquid cooling or air cooling it is possible to use a circuit with at least one heat sink which outputs the waste heat of the modules 200 to the surroundings or to a component of the vehicle to be heated (e.g. in the winter to a lead battery or to the passenger compartment of the vehicle). This is illustrated, for example, in FIG. 3C where it is shown that a first part 301 of the heat of the temperature-control duct 300 is carried away to a component of the vehicle which is to be heated, and that a second part 302 of the heat is output to the surroundings of the vehicle. For example, with the first part 301 the sucked-in air from the vehicle passenger compartment air-conditioning system can be temperature-controlled (cooled/heated).

In the case of air cooling, the thermal energy in the air duct 300 which can be mounted above, below or else to the side of the supply rail 100 is exchanged. The air duct 300 can be formed here in a synergistic fashion at least partially by the bodywork of the vehicle, for example by covering the air duct 300 with the supply rail 100. In other words, at least one side wall of the temperature-control duct 300 can be formed by the bodywork of the vehicle. In an analogous fashion, a liquid duct can also be formed at least partially by the bodywork of the vehicle.

The preparation of the thermally conductive medium (e.g. the cooling) for the passage through the temperature-control duct 300 can be carried out during a regeneration phase of a vehicle, i.e. with the energy recovered from the kinetic energy of the vehicle. For example, the medium can be cooled by way of a mechanical or an electric coolant compressor of the vehicle in a regeneration phase of the vehicle. The cooled medium can then be used in a later phase to cool the modules 200 at the supply rail 100. It is therefore possible to provide a thermal energy accumulator for regenerating kinetic energy of the vehicle through the central temperature control of the modules 200. In an analogous fashion, a heater can also be operated with waste energy and/or regeneratively recovered energy in order to provide a thermal energy accumulator.

The regeneration of kinetic energy of the vehicle to store thermal energy can, according to the possibilities, be carried out completely by using the thermal inertia of the modules 200 in the assembly and, under certain circumstances, by utilizing predictive information (e.g. navigation information, car-2-x communication, acquisition of information and processing of information in a backend server). In other words, owing to the thermal inertia of the modules 200 which are connected by the temperature-control duct 300, it is to be expected that the necessary thermal energy can be generated completely in the regeneration phases of the vehicle. Predictive information can be used to compensate the thermal energy requirement of the modules 200 and the quantity of thermal energy which can be generated by means of regeneration.

This can be done by a control unit which is designed to detect or coordinate the energy requirements of the individual modules 200. For example, the control unit (e.g. a heat management system) can be implemented as software on an integrated control unit on the supply rail 100 and be interconnected to the other modules 200 via the data lines 101. Air flaps at the inlet or at the outlet of the temperature-control duct 300 or pumps and valves for the thermally conductive medium can be utilized as control devices for the thermal energy.

The control unit can be designed to perform open-loop or closed-loop control of the thermal coupling in such a way that sufficient thermal energy, e.g. for cooling, can always be output to the stream of air or liquid of the temperature-control duct 300. That is to say the quantity and/or temperature of the medium at the inlet of the temperature-control duct 300 can be detected on the basis of the thermal energy requirement of all of the modules 200, with the result that none of the modules 200 reaches or exceeds a thermal limiting value.

In order to use regeneration energy, in one regeneration phase of the vehicle (e.g. in the case of downhill travel) cold cooling air can be generated (or the coolant can be additionally cooled) in order to be able to absorb the heat of the modules 200 again at a later time. For example, in winter the heated waste air (the part 301) can also be used to heat a lead battery of the vehicle so that this battery experiences better charging acceptance as a result of the increase in the temperature and therefore the risk of the vehicle becoming immobilized owing to a discharged battery is reduced.

Figure 4:
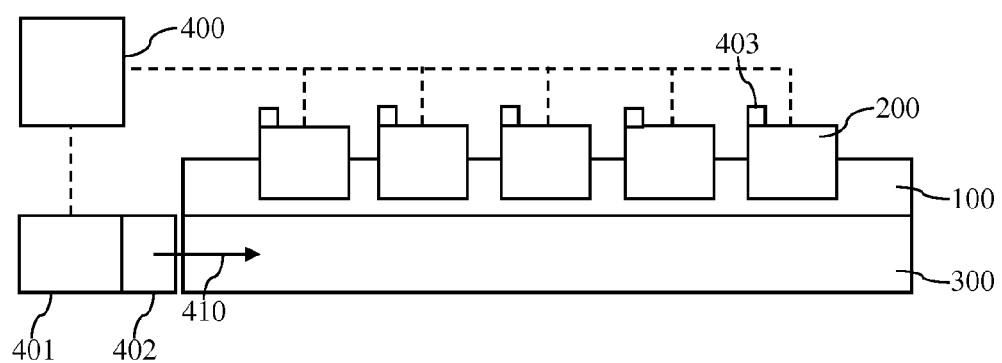
FIG. 4 is a schematic diagram of an exemplary arrangement for controlling a stream of coolant in a temperature-control duct.

FIG. 4 shows an exemplary control unit 400 which is configured to set properties of a medium 410 in a temperature-control duct 300 (e.g. to perform open-loop or closed-loop control thereof). The control unit 400 is designed to detect information relating to the necessary quantity of thermal energy for controlling the temperature of the one or more modules 200 placed on the supply rail 100. For example, a module 200 can have a temperature sensor 403 which is designed to detect a temperature of the module 200. The necessary quantity of thermal energy for controlling the temperature of the module 200 can then be detected on the basis of the temperature of the module 200.

Furthermore, the control unit 400 is designed to detect a property of the medium 410 at the input of the temperature-control duct 300 as a function of the information relating to the necessary quantity of thermal energy. For example, a temperature and/or a pressure of the medium 410 can be detected. Furthermore, the control unit 400 can be designed to cause devices 401, 402 for providing the medium 410 to provide the medium 410 at the input of the temperature-control duct 300 in accordance with the detected properties. For example, a cooling assembly or a heater 401 can be made to cool or to heat the medium. Furthermore, a pump 402 can set a pressure of the medium 410. It is therefore possible for efficient temperature control of the modules 200 to be carried out.

The provision of a temperature-control duct 300 with a supply rail 100 permits cost-effective integration of vehicle modules 200 even under thermally difficult conditions. Furthermore, the use of regeneration energy for cooling/heating (and therefore for reducing the fuel consumption) is made possible by the central temperature-control duct 300. Furthermore, by means of synergies when the temperature-control duct 300 is installed in the bodywork of the vehicle, it is possible to achieve implementation of the temperature-control of the modules 200 of the vehicle in a way which is optimum in terms of weight and cost. As a result of the provision of a central temperature-control duct 300, only a single heat management system is required for a multiplicity of modules 200, which also results in savings in terms of cost and weight. Moreover, a central heat management system permits new functions to be provided (e.g. the heating of a lead battery in the winter). Furthermore, a central temperature-control duct 300 permits the thermal loading of the modules 200 of the vehicle to be reduced, as a result of which an increase in the service life of the modules 200 can be brought about and/or which provides the possibility of using cost-effective components in the modules 200.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A supply rail for a vehicle, comprising:
    a first busbar which is configured to provide electrical energy with a first supply voltage for supplying energy to a multiplicity of electrical modules of the vehicle, wherein the electrical modules of the multiplicity of electrical modules are arranged at different points on the vehicle;
    means for transmitting data, which transmitting means are configured to permit a data exchange between at least two of the multiplicity of electrical modules;
    a multiplicity of plug-in locations arranged on an external surface of the supply rail, each of which is configured to receive an electrical plug of one of the multiplicity of electrical modules, wherein a first plug-in location of the multiplicity of plug-in locations is configured to receive a first plug of a first electrical module at the external surface to connect, via a first plug-in connection, the first electrical module of the multiplicity of electrical modules to the first busbar and to the means for transmitting data; and
    a temperature-control duct which is configured to carry a thermally conductive medium past a multiplicity of the plug-in locations.

2. The supply rail as claimed in claim 1, wherein the thermally conductive medium comprises a liquid or a gaseous medium.

3. The supply rail as claimed in claim 1, wherein the temperature-control duct is arranged along the multiplicity of plug-in locations.

4. The supply rail as claimed in claim 2, wherein the temperature-control duct is formed at least partially by a bodywork of the vehicle.

5. The supply rail as claimed in claim 3, wherein the temperature-control duct is formed at least partially by a bodywork of the vehicle.

6. The supply rail as claimed in claim 1, wherein
    the supply rail comprises means for permitting thermal energy to be transmitted with a specific conductivity from the first electrical module to the thermally conductive medium, and vice versa; and
    the specific conductivity is higher than a specific conductivity of air.

7. An on-board power system for a vehicle, comprising:
    a multiplicity of electrical modules, wherein the electrical modules of the multiplicity of electrical modules are arranged at different points on the vehicle; and
    a supply rail, the supply rail comprising:
        a first busbar which is configured to provide electrical energy with a first supply voltage for supplying energy to the multiplicity of electrical modules of the vehicle;
        means for transmitting data, which transmitting means are configured to permit a data exchange between at least two of the multiplicity of electrical modules;
        a multiplicity of plug-in locations arranged on an external surface of the supply rail, each of which is configured to receive an electrical plug of one of the multiplicity of electrical modules, wherein a first plug-in location of the multiplicity of plug-in locations is configured to receive a first plug of a first electrical module at the external surface to connect, via a first plug-in connection, the first electrical module of the multiplicity of electrical modules to the first busbar and to the means for transmitting data; and
        a temperature-control duct which is configured to carry a thermally conductive medium past a multiplicity of the plug-in locations.

8. The on-board power system as claimed in claim 7, wherein the thermally conductive medium comprises a liquid or a gaseous medium.

9. The on-board power system as claimed in claim 7, wherein the temperature-control duct is arranged along the multiplicity of plug-in locations.

10. The on-board power system as claimed in claim 7, wherein the temperature-control duct is formed at least partially by a bodywork of the vehicle.

11. The on-board power system as claimed in claim 7, wherein
    the supply rail comprises means for permitting thermal energy to be transmitted with a specific conductivity from the first electrical module to the thermally conductive medium, and vice versa; and
    the specific conductivity is higher than a specific conductivity of air.

12. The on-board power system as claimed in claim 7, wherein the on-board power system further comprises a control unit, the control unit being configured to:
    detect a requirement for thermal energy of the multiplicity of electrical modules; and
    determine a property of the thermally conductive medium as a function of the requirement of thermal energy.

13. The on-board power system as claimed in claim 12, wherein the property is one or both of a temperature and a pressure of the thermally conductive medium.

14. The on-board power system as claimed in claim 12, wherein the control unit is further configured to:
   detect when the vehicle is in a regeneration phase; and
   cause the thermally conductive medium to be adapted according to the determined property during the regeneration phase.

15. The on-board power system as claimed in claim 12, wherein:
   the control unit is arranged in a second plug-in location of the supply rail; and
   the control unit is further configured to communicate with the multiplicity of electrical modules via the means for transmitting data, in order to detect the requirement for thermal energy.

16. The on-board power system as claimed in claim 12, wherein the control unit is further configured to:
   determine that thermal energy is to be fed to a component of the vehicle which is not arranged on one of the multiplicity of plug-in locations of the supply rail; and
   cause the thermally conductive medium to be at least partially fed to the component of the vehicle at an outlet of the temperature-control duct in order to feed thermal energy to the component.

17. The supply rail as claimed in claim 1, wherein at least one of the multiplicity of electrical modules is arranged in a region of the vehicle different than a region of the supply rail.

18. The on-board power system as claimed in claim 7, wherein at least one of the multiplicity of electrical modules is arranged in a region of the vehicle different than a region of the supply rail.

19. A supply rail for a vehicle, comprising:
   a first busbar which is configured to provide electrical energy with a first supply voltage for supplying energy to a multiplicity of electrical modules of the vehicle, wherein the electrical modules of the multiplicity of electrical modules are arranged at different points on the vehicle;
   means for transmitting data, which transmitting means are configured to permit a data exchange between at least two of the multiplicity of electrical modules;
   a multiplicity of plug-in locations arranged on an external surface of the supply rail, wherein a first plug-in location of the multiplicity of plug-in locations is configured to connect, via a first plug-in connection at the external surface, a first electrical module of the multiplicity of electrical modules to the first busbar and to the means for transmitting data; and
   a temperature-control duct which is configured to carry a thermally conductive medium past a multiplicity of the plug-in locations,
   wherein the temperature-control duct is formed at least partially by a bodywork of the vehicle.

* * * * *